US008754888B2

(12) United States Patent
Virtue et al.

(10) Patent No.: US 8,754,888 B2
(45) Date of Patent: Jun. 17, 2014

(54) SYSTEMS AND METHODS FOR SEGMENTING THREE DIMENSIONAL IMAGE VOLUMES

(75) Inventors: Patrick Virtue, Waukesha, WI (US);
Gopal Avinash, Waukesha, WI (US);
Adam Budde, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 13/108,882

(22) Filed: May 16, 2011

(65) Prior Publication Data

US 2012/0293514 A1 Nov. 22, 2012

(51) Int. Cl.
*G06T 15/08* (2011.01)

(52) U.S. Cl.
USPC ........................................................ 345/424

(58) Field of Classification Search
USPC ........................................................ 345/424
See application file for complete search history.

(56) References Cited

U.S. PATENT DOCUMENTS

| 6,888,916 | B2 | 5/2005 | Launay et al. | |
|---|---|---|---|---|
| 7,386,153 | B2 * | 6/2008 | Kim | ............................. 382/128 |
| 7,469,073 | B2 | 12/2008 | Paladini et al. | |
| 7,561,725 | B2 | 7/2009 | Liang | |
| 2006/0177133 | A1 | 8/2006 | Kee | |
| 2007/0003016 | A1 | 1/2007 | Brunner et al. | |
| 2007/0133845 | A1 | 6/2007 | Fradkin et al. | |
| 2007/0244389 | A1 | 10/2007 | Hoppel et al. | |
| 2008/0024485 | A1 | 1/2008 | Barrett et al. | |
| 2008/0063248 | A1 | 3/2008 | Young et al. | |
| 2008/0193006 | A1 | 8/2008 | Udupa et al. | |
| 2008/0246768 | A1 * | 10/2008 | Murray et al. | ................ 345/427 |
| 2009/0129671 | A1 | 5/2009 | Hu et al. | |

FOREIGN PATENT DOCUMENTS

| WO | 03/043490 A1 | 5/2003 |
|---|---|---|
| WO | 03/045222 A2 | 6/2003 |
| WO | WO 2004/081871 | 9/2004 |

OTHER PUBLICATIONS

Search Report and Written Opinion from corresponding PCT Application No. PCT/US2012/037903 dated Sep. 10, 2012.
Hamarneh, et al., "3D live-wire-based semi-automatic segmentation of medical images", Medical Imaging 2005: Image Processing, Proceedings of SPIE, vol. 5747, Apr. 2005, pp. 1597-1603.
Jolly et al., "3D General Lesion Segmentation in CT", 5th IEEE International Symposium on Biomedical Imaging: from Nano to Macro, May 2008, pp. 796-799.
Malmberg et al., "A 3D Live-Wire Segmentation Method for Volume Images Using Haptic Interaction", Springer Berlin Heidelberg, Proceedings of the 13th international conference on Discrete Geometry for Computer Imagery, vol. 4245; Oct. 2008, pp. 663-673.

(Continued)

*Primary Examiner* — Edward Martello
(74) *Attorney, Agent, or Firm* — General Electric Company; Lucas Divine

(57) ABSTRACT

A method is provided for segmenting three-dimensional (3D) image volumes. The method includes obtaining a 3D volume data set corresponding to an imaged volume, rendering at least a portion of the 3D volume data set based on 3D rendering settings, and creating a two-dimensional (2D) segmentation of the rendered 3D volume data set. The method further includes segmenting the 3D volume data set using the 2D segmentation and the 3D rendering settings to define a 3D region of interest within the 3D volume data set.

20 Claims, 13 Drawing Sheets

(56) References Cited

OTHER PUBLICATIONS

Cagnoni et al., "Genetic algorithm-based interactive segmentation of 3D medical images", Image and Vision Computing, Elsevier, vol. 17, Issue 12, Oct. 1999, pp. 881-895.

Loncaric, et al, "Semi-automatic active contour approach to segmentation of computed tomography volumes", Proceedings SPIE 3979, Medical Imaging 2000: Image Processing, 917 Jun. 2000, 8 pages.

Olabarriaga et. al., "Interaction in the segmentation of medical images: A survey" Elsevier, Medical Image Analysis, vol. 5, Issue 2, Jun. 2001 pp. 127-142.

Schenk, et al., "Efficient Semiautomatic Segmentation of 3D Objects in Medical Images", MICCAI Conference 2000, Springer, Lecture Notes in Computer Science vol. 1935, Oct. 2000 pp. 186-195.

Vidholm et al., "Fast surface rendering for interactive medical image segmentation with haptic feedback", Conference Proceedings of SIGRAD Nov. 2004; Issue 013, pp. 33-39.

Wang, et al. "Semiautomatic three-dimensional segmentation of the prostate using two-dimensional ultrasound images" Medical Physics vol. 30; No. 5, May 2003 pp. 887-897.

\* cited by examiner

SYSTEMS AND METHODS FOR SEGMENTING THREE DIMENSIONAL IMAGE VOLUMES

BACKGROUND OF THE INVENTION

The subject matter disclosed herein relates generally to 3D image volumes, and more particularly to systems and methods for segmenting 3D image volumes to define 3D regions of interest therewithin.

Segmentation is commonly used to outline objects and/or regions within 3D image volumes. For example, 3D image volumes may be segmented for surgical planning, for radiation planning, and/or for general object identification. However, segmenting 3D image volumes may be difficult, tedious, and/or time-consuming. For example, at least some known methods of segmenting 3D image volumes require a greater amount of user input than is desired and are therefore less efficient in use.

One known method for segmenting 3D image volumes includes segmenting each slice of the 3D image volume one at a time. The segmented slices are then combined to form a segmented 3D image volume. Segmenting each slice one at a time is difficult, tedious, and/or time-consuming. Moreover, the difficulty and tediousness of segmenting slices one at a time may require a greater amount of user input than is desired. Some other known methods for segmenting 3D image volumes include manually or semi-automatically segmenting several slices of a 3D image volume, and using the several segmented slices as a seed for segmenting the remainder of the 3D image volume. However, methods that use several segmented slices as a seed for segmenting the remainder of a 3D volume suffer from the same disadvantages of methods that segment one slice at a time. Namely, such methods may also be difficult, tedious, time-consuming, and/or less efficient in use.

BRIEF DESCRIPTION OF THE INVENTION

In one embodiment, a method is provided for segmenting three-dimensional (3D) image volumes. The method includes obtaining a 3D volume data set corresponding to an imaged volume, rendering at least a portion of the 3D volume data set based on 3D rendering settings, and creating a two-dimensional (2D) segmentation of the rendered 3D volume data set. The method further includes segmenting the 3D volume data set using the 2D segmentation and the 3D rendering settings to define a 3D region of interest within the 3D volume data set.

In another embodiment, a system is provided for segmenting three-dimensional (3D) image volumes. The system includes a computer configured to obtain a 3D volume data set corresponding to an imaged volume, render at least a portion of the 3D volume data set based on 3D rendering settings, create a two-dimensional (2D) segmentation of the rendered 3D volume data set, and segment the 3D volume data set using the 2D segmentation and the 3D rendering settings to define a 3D region of interest within the 3D volume data set. The system also includes a display configured to display the segmented 3D volume data set.

In another embodiment, a non-transitory computer readable medium includes instructions to instruct a computer to render at least a portion of a 3D volume data set using 3D rendering settings, create a two-dimensional (2D) segmentation of the rendered 3D volume data set, and segment the 3D volume data set using the 2D segmentation and the 3D rendering settings to define a 3D region of interest within the 3D volume data set.

DETAILED DESCRIPTION OF THE INVENTION

Figure 1:
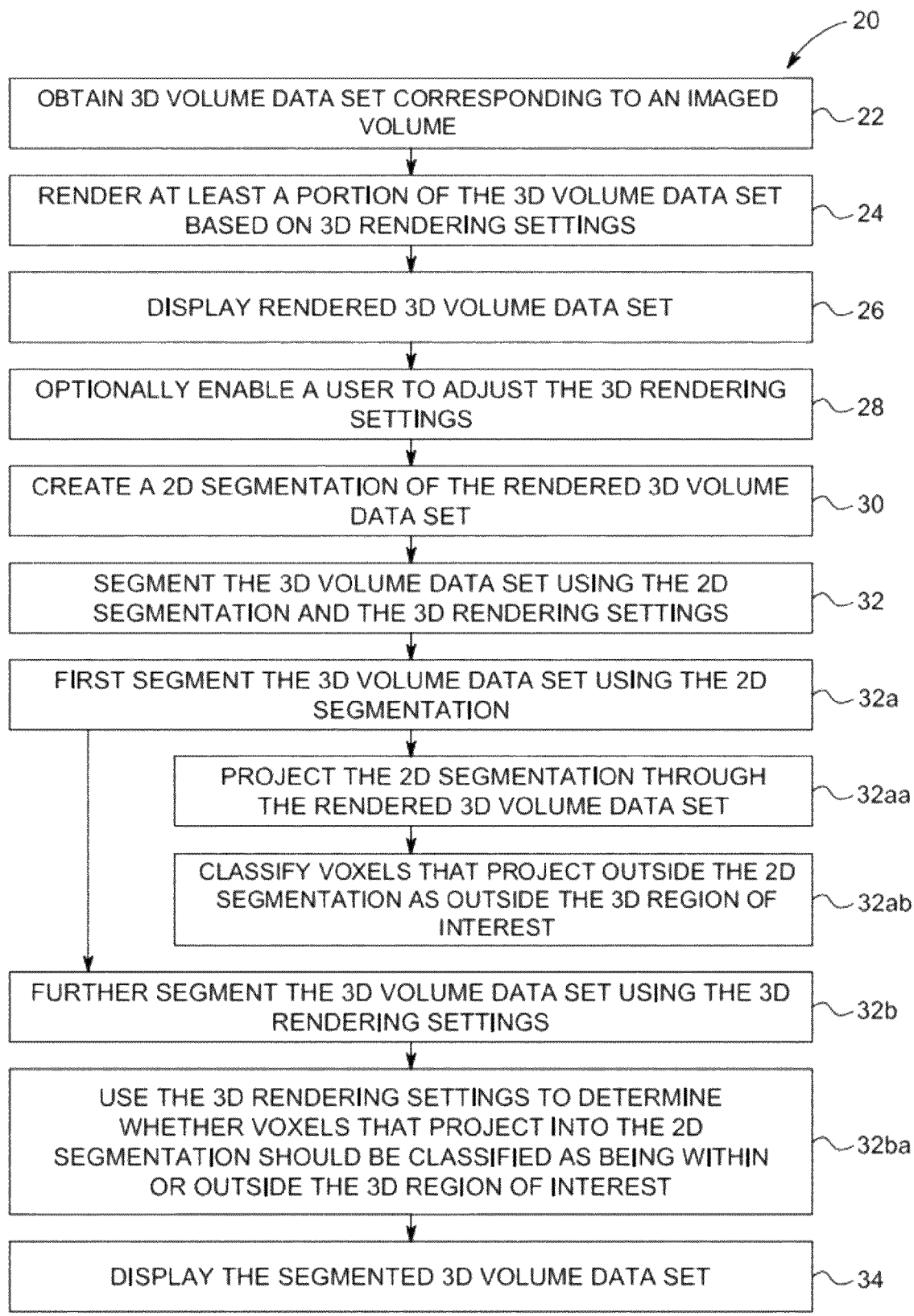
FIG. 1 is a flowchart of an exemplary embodiment of a method for segmenting three-dimensional (3D) image volumes.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the term "reconstructing" or "rendering" an image or data set is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide systems and methods for segmenting three-dimensional (3D) image volumes. At least a portion of a 3D data set corresponding to an imaged volume is rendered based on 3D rendering settings. A two-dimensional (2D) segmentation of the rendered 3D volume data set is created, and the 3D volume data set is segmented using the 2D segmentation and the 3D rendering settings to define a 3D region of interest within the 3D volume data set. At least one technical effect of the various embodiments is a 3D segmentation process that is faster, less difficult, less tedious, and/or more efficient for the user. At least one other technical effect of the various embodiments is a 3D segmentation process that outputs an image segmentation that intuitively aligns with what the user sees.

Figure 2:
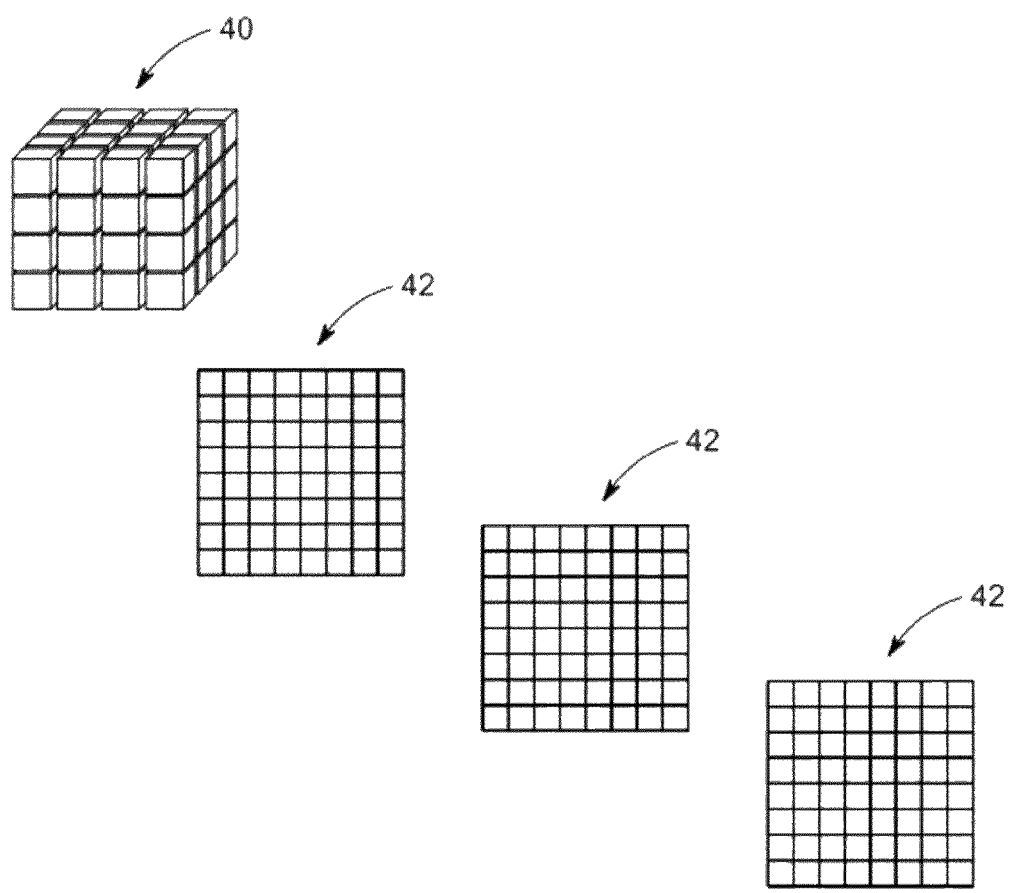
FIG. 2 illustrates a 3D image volume formed from a stack of two-dimensional (2D) image slices from which a 3D region of interest may be segmented in accordance with various embodiments.

Specifically, various embodiments provide a method 20 as illustrated in FIG. 1 for segmenting 3D image volumes, for example a 3D image volume 40 (as shown in FIG. 2) having a plurality of image voxels corresponding to image data. It should be noted that the 3D image volume 40 is generally formed from a plurality of 2D image slices 42 arranged in a stack. The 3D image volume may correspond to all or any portion of any object. For example, in the exemplary embodiment, the 3D image volume is of a human individual. However, the 3D image volume may alternatively be of another living creature besides a human individual. Moreover, the 3D image volume is not limited to living creatures, but rather may be of inanimate objects, such as, but not limited to, luggage, shipping containers, and/or the like.

In particular, and referring to the method 20 of FIG. 1, at 22 a 3D volume data set corresponding to an imaged volume is obtained, for example, from a CT scan of a patient or a portion of a patient. Although the method 20 is described in connection with a CT scan, the method 20 may be implemented in connection with any other imaging modality, such as, but not limited to, magnetic resonance imaging (MRI), ultrasound, positron emission tomography (PET), and/or the like. In the exemplary embodiment, the 3D volume data set may be acquired by any x-ray imaging system, such as any diagnostic or clinical CT imaging system. For example, in an axial scan of a patient (or a portion of the patient), an x-ray source and a detector array are rotated with a gantry within an imaging plane and around the patient to be imaged such that the angle at which the x-ray beam intersects the patient constantly changes. A group of x-ray attenuation measurements, known as projection data, from the detector array at one gantry angle is referred to as a view. A scan of the patient comprises a set of views made at different gantry angles, or view angles, during one revolution of the x-ray source and detector.

The projection data is processed to construct an image that corresponds to a 2D slice taken through the patient. One method for reconstructing an image from a set of projection data is referred to in the art as the filtered back projection technique. This process converts the attenuation measurements from a scan into integers called CT numbers or Hounsfield Units (HU), which are used to control the brightness of a corresponding pixel on a cathode ray tube display. Accordingly, in various embodiments, the 3D image volume data includes image data having an HU value for each of the voxels in the imaged 3D volume, such as the 3D image volume 40.

After obtaining the 3D volume data set at 22, the method 20 includes rendering at 24 at least a portion of the 3D volume data set based on 3D rendering settings. By rendering "at least a portion" of the 3D volume data set, it is meant that the entire or a subset of the 3D volume data set may be rendered, for example, such that an image is reconstructed or formed from the data. The 3D rendering settings used to render the 3D volume data set at 24 determine how one or more images of the 3D volume data set will be viewed by a user. The 3D rendering settings may include, but are not limited to, orientation, the type of renderer (e.g., volume rendering, maximum intensity projection (MIP), etc.), a depth setting, a clipping setting, a thickness setting, an opacity map, and/or the like. The rendered 3D volume data set is then displayed at 26 based on the 3D rendering settings. For example, as shown in the display 59 of FIG. 3, a rendered 3D volume data set that corresponds to an imaged patient is displayed as a 3D image 60*a*. The display 59 includes four images, namely the 3D image 60*a* of a patient's neck and jaw, as well as 2D coronal, axial, and sagittal images 60*b*, 60*c*, and 60*d*, respectively, of the patient's neck and jaw. Although the display 59 generally shows only a portion of the patient, the 3D image volume data in various embodiments corresponds to an entire body scan of the patient.

Figure 3:
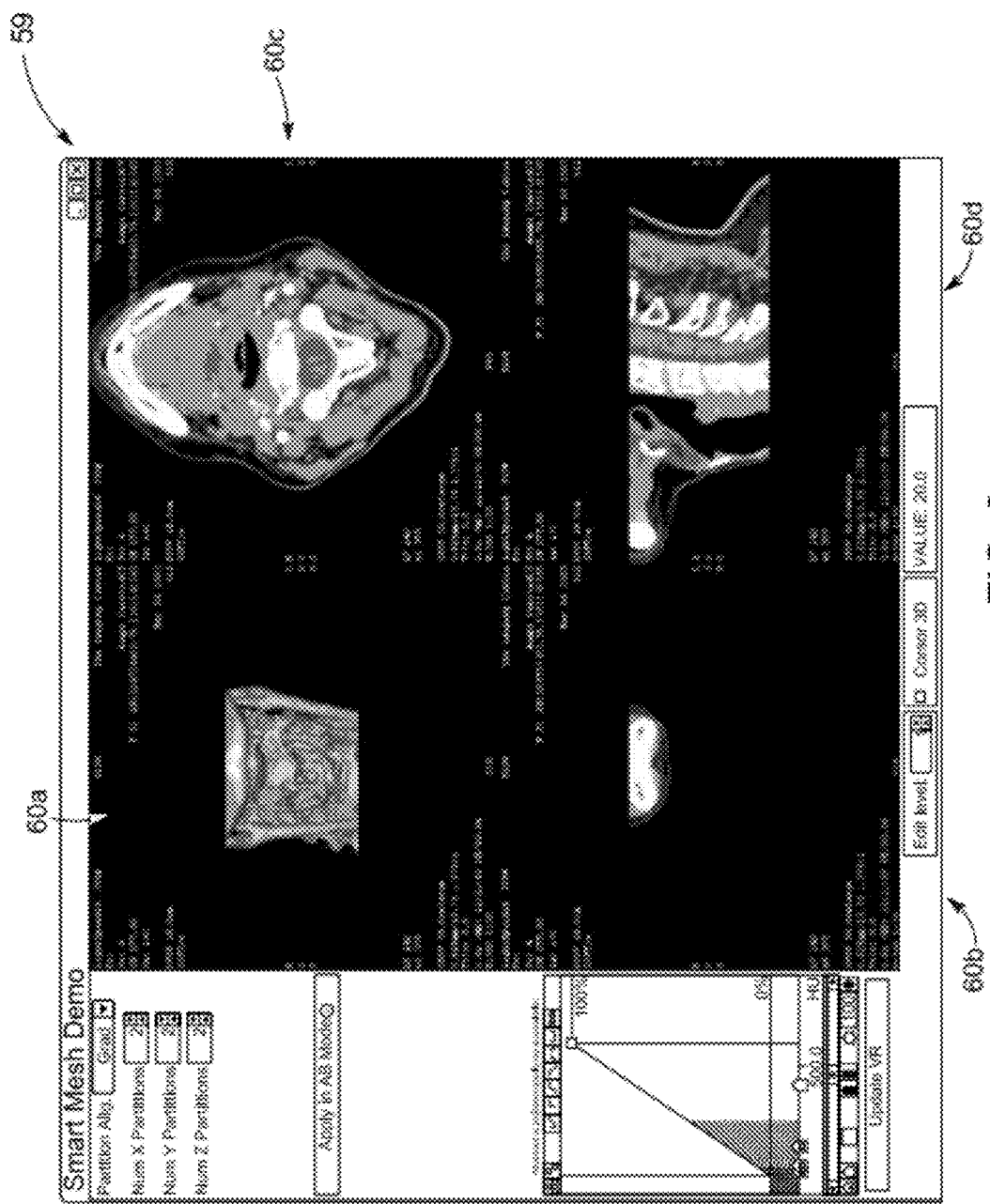
FIG. 3 is a computed tomography (CT) image corresponding to a rendered 3D volume data set in accordance with various embodiments.
Figure 4:
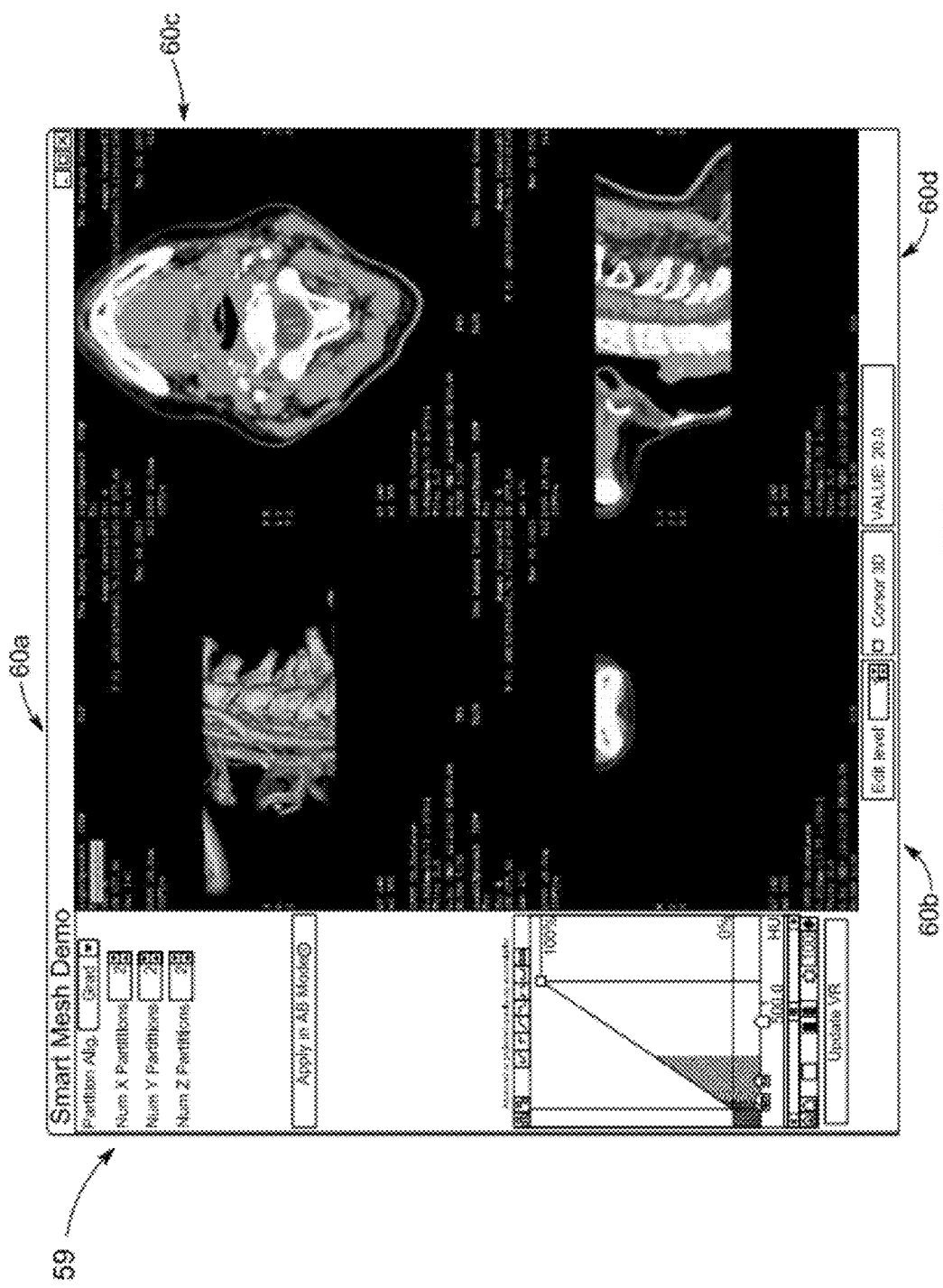
FIG. 4 illustrates the CT image shown in FIG. 3 after a 3D rendering setting has been adjusted by a user.
Figure 5:
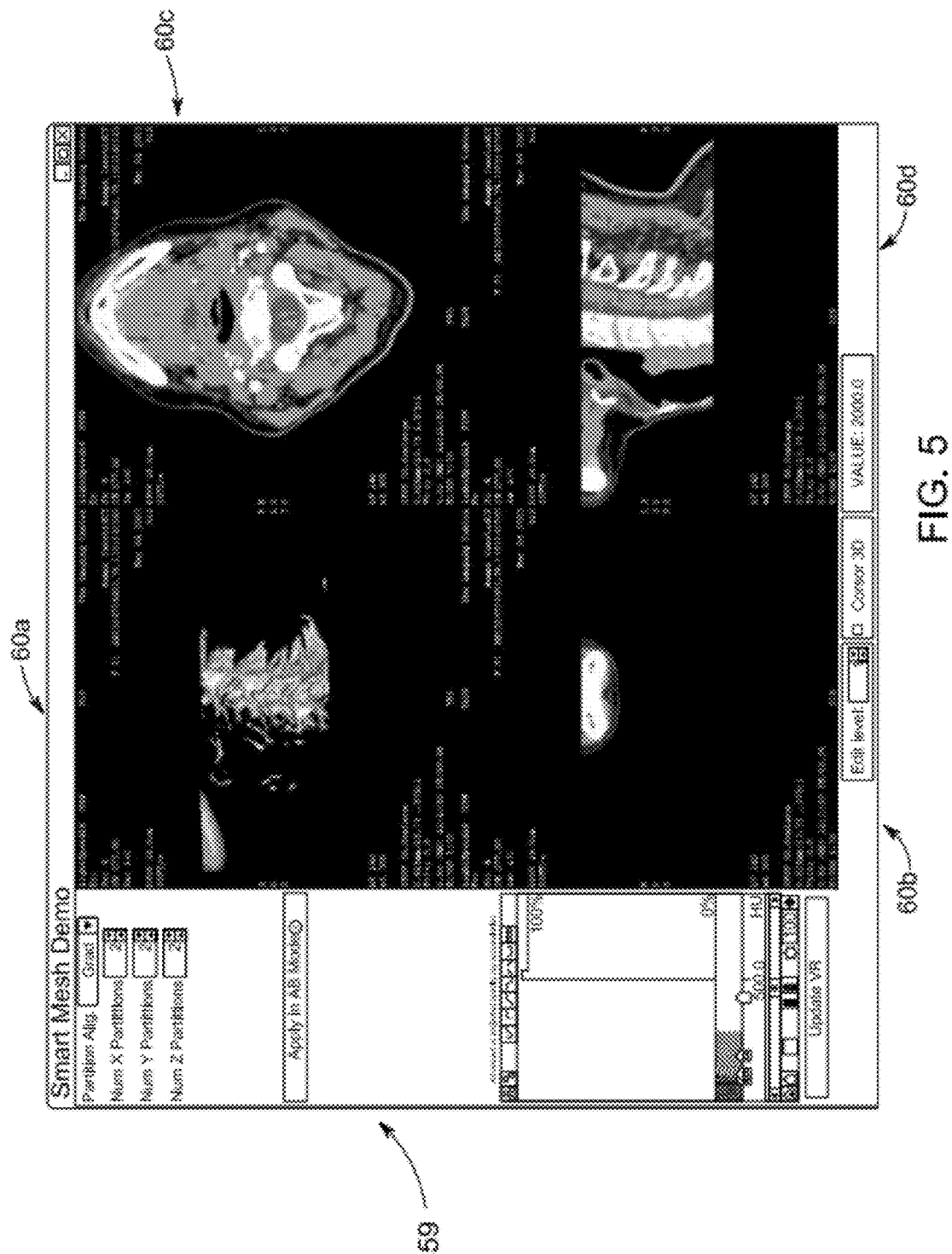
FIG. 5 illustrates the CT image shown in FIG. 4 after another 3D rendering setting has been adjusted by the user.

Optionally, the method 20 includes enabling at 28 a user to adjust the 3D rendering settings to thereby adjust how the rendered 3D volume data set is viewed by the user. For example, FIG. 4 illustrates the display 59 after the user has adjusted the orientation of the 3D image 60*a*. Before the user's orientation adjustment, the 3D image of the patient's neck and jaw is shown in FIG. 3 from the coronal view. In the exemplary embodiment, the user has rotated the 3D image 60*a* from the coronal view shown in FIG. 3 to a sagittal view, as shown in FIG. 4. User adjustment of the 3D rendering settings is not limited to orientation, but rather any 3D rendering setting(s) may be adjusted by the user to change how the rendered 3D volume data set is viewed by the user. FIG. 5 illustrates another example of an adjustment of a 3D rendering setting by the user. More particularly, in FIG. 5 the user has adjusted the opacity map of the rendered 3D volume data set such that only bone is visible in the 3D image 60*a*. For example, image voxels having an HU value above a predetermined bone HU threshold value (such as, but not limited to, approximately 200 HU), which defines a bone threshold, are displayed within the 3D image 60*a*, while image voxels having an HU value below the predetermined bone HU threshold value are not displayed within the 3D image 60*a*.

Figure 6:
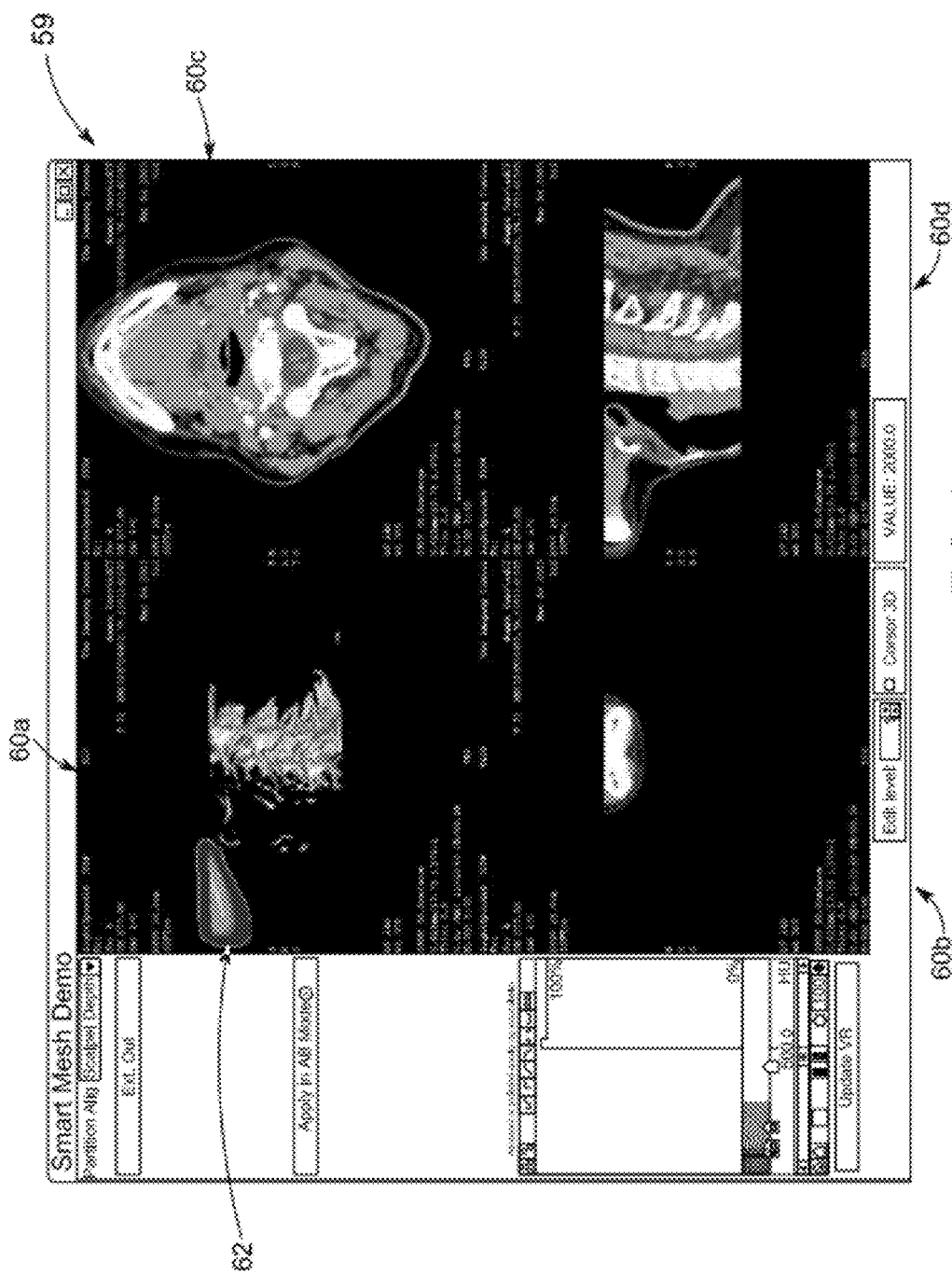
FIG. 6 illustrates the CT image shown in FIG. 5 after a 2D segmentation has been created within a 3D image of the CT image.

Referring again to FIG. 1 and the method 20, at 30, the method 20 includes creating a 2D segmentation of the rendered 3D volume data set. The 2D segmentation is a 2D region of interest selected within the rendered 3D volume data set. For example, FIG. 6 illustrates a 2D segmentation 62 that has been created within the 3D image 60*a*. In the exemplary embodiment, the 2D segmentation 62 is a portion of the person's mandible, but the 2D segmentation 62 may of any portion of the rendered 3D volume data set. The 2D segmentation of the rendered 3D volume data set may be created using any suitable method, process, means, structure, and/or the like. In some embodiments, the 2D segmentation is manually created at 30 by the user by drawing or virtually tracing on a screen the 2D segmentation on the rendered 3D volume data set. For example, as shown in FIG. 6, the user has drawn the 2D segmentation 62 using an input device, such as, but not limited to, a mouse, a touch pad, a pointer, a stylist, and/or the like. In other embodiments, the 2D segmentation is created at 30 semi-automatically or fully-automatically using a computer (e.g., the computer 236 shown in FIG. 13). For example, when the 2D segmentation is semi-automatically created, the user guides the computer to create the 2D segmentation (e.g., using a live-wire-based segmentation, seeded watershed segmentation, and/or the like). One example of fully automatic 2D segmentation using a computer includes, but is not limited to, automatic thresholding.

Once the 2D segmentation has been created at 30, the method 20 includes segmenting at 32 the 3D volume data set using both the 2D segmentation and the 3D rendering settings to define a 3D region of interest within the 3D volume data set. The segmenting at 32 includes segmenting at 32a the 3D volume data set first using the 2D segmentation, and thereafter further segmenting at 32b the 3D volume data set using the 3D rendering settings. Segmenting at 32a the 3D volume data set using the 2D segmentation includes projecting at 32aa the 2D segmentation through the rendered 3D volume data set. For example, the 2D segmentation may be projected through the rendered 3D volume data set along a straight line that extends in the direction of the orientation of the rendered 3D volume data set. Any voxels that project outside the 2D segmentation are classified at 32ab as being outside of the 3D region of interest.

Figure 7:
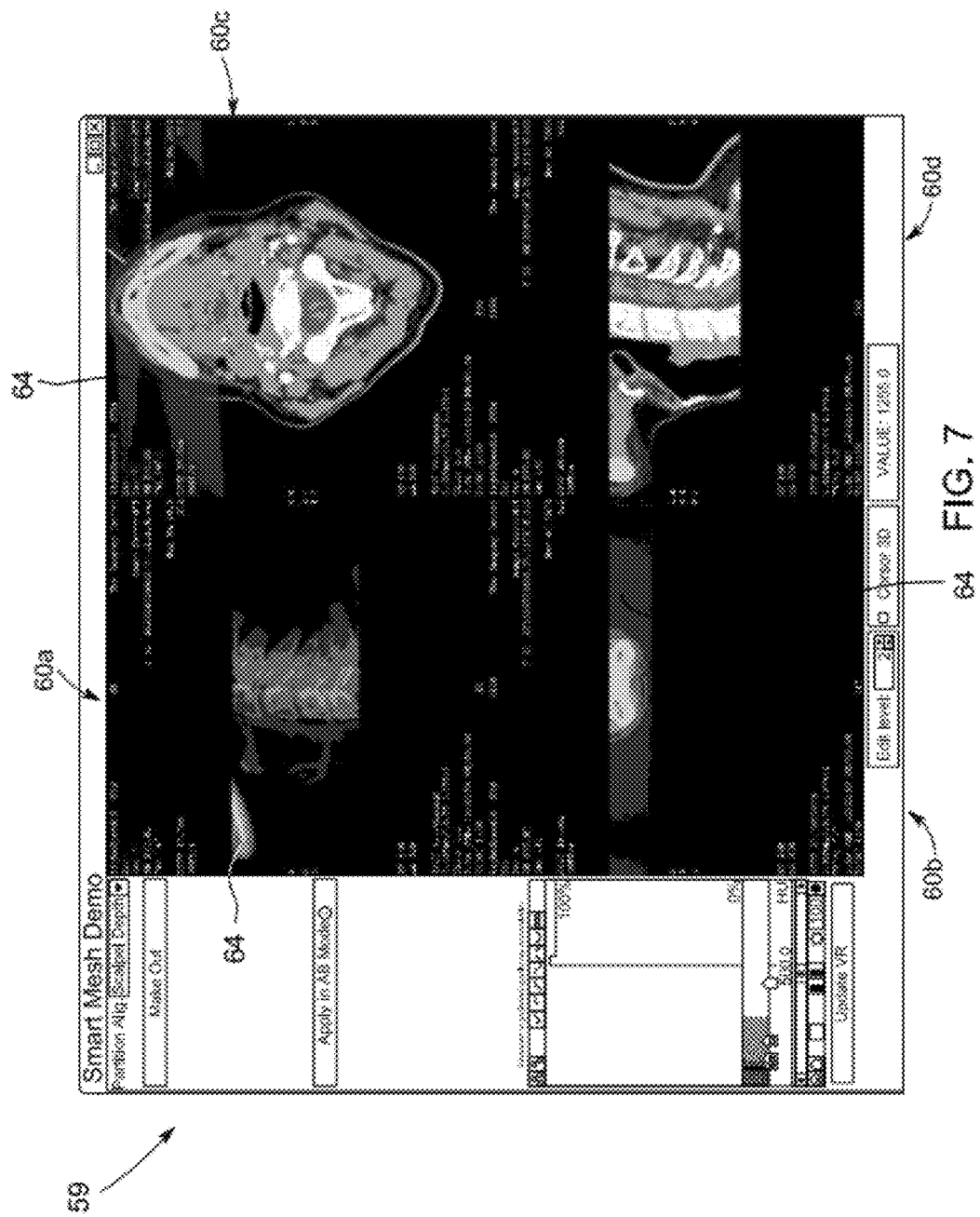
FIG. 7 illustrates the CT image shown in FIG. 6 after the rendered 3D volume data set has been segmented using the 2D segmentation.

As shown in FIG. 7, the 3D volume data set has been segmented using the 2D segmentation as described above. The segmentation shown in FIG. 7 has not been segmented based on the 3D rendering settings, but rather has only been segmented based on the 2D segmentation. The segmented region is indicated in the images 60a-60d of FIG. 7 by the outlined region 64. In the exemplary embodiment, the 3D region of interest that is desired to be segmented at 32 is the bone of a patient's mandible. As best seen in the 2D axial and coronal views 60c and 60b of FIG. 7, without using the 3D rendering settings, the segmentation includes a significant amount of extra material within the patient's mandible besides the bone thereof.

Referring again to FIG. 1, as described above, during the segmentation at 32a using the 2D segmentation, any voxels that project outside the 2D segmentation are classified at 32ab as being outside of the 3D region of interest. The further segmentation step at 32b includes using at 32ba the 3D rendering settings to determine whether voxels that project into the 2D segmentation should be classified as being within or outside the 3D region of interest. Accordingly, voxels that project into the 2D segmentation are segmented separately from voxels that do not project within the 2D segmentation. By using the 3D rendering settings to determine whether voxels that project into the 2D segmentation are classified as within or outside the 3D region of interest, only voxels that are visible to a user in the rendered 3D volume data set will be classified as being within the 3D region of interest. Any of the 3D rendering settings may be used at 32ba to determine whether voxels that project into the 2D segmentation should be classified as being within or outside the 3D region of interest, such as, but not limited to, the type of renderer, a depth setting, a clipping setting, a thickness setting, an opacity map, and/or the like. One example of using the 3D rendering settings to further segment the 3D volume data set includes automatically intersecting the projected 2D segmentation with regions containing voxels rendered with an opacity not equal to zero.

Figure 8:
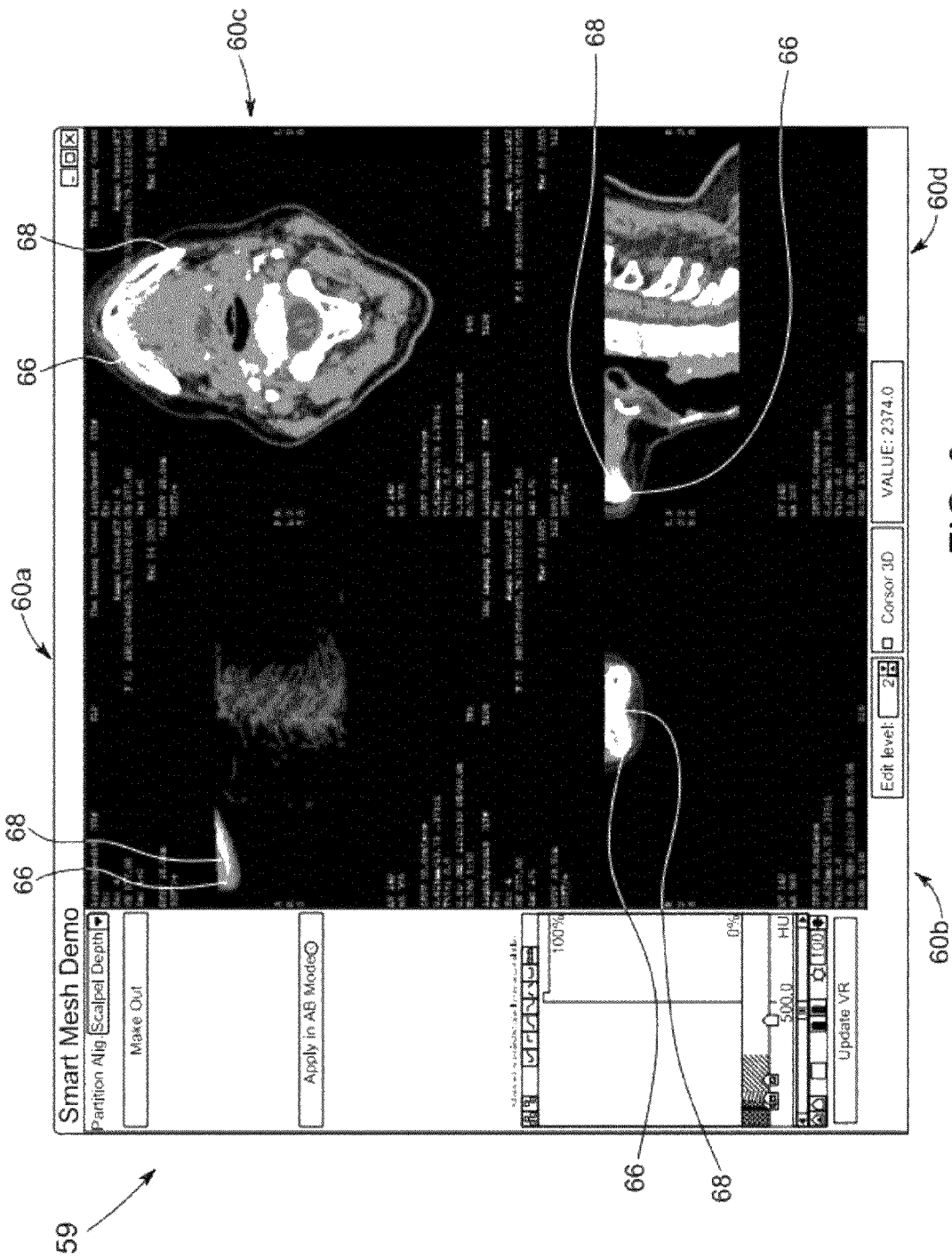
FIG. 8 illustrates the CT image shown in FIG. 6 after the rendered 3D volume data set has been segmented using the 3D rendering settings.

FIG. 8 illustrates the 3D volume data set after the further segmentation at 32b. More specifically, FIG. 8 illustrates the 3D volume data set after the 3D volume data set has been segmented at 32a and at 32b using both the 2D segmentation and the 3D rendering settings, respectively. The 3D region of interest is indicated by the boundary lines 66 and the shading 68 in the images 60a-60d of FIG. 8. In the exemplary embodiment of FIG. 8, the 3D volume data set has been segmented such that the 3D region of interest includes only the bone of the patient's mandible. The images 60b-d show what the user expects to see based on the 2D segmentation created at 30 within the 3D image 60a.

Figure 9:
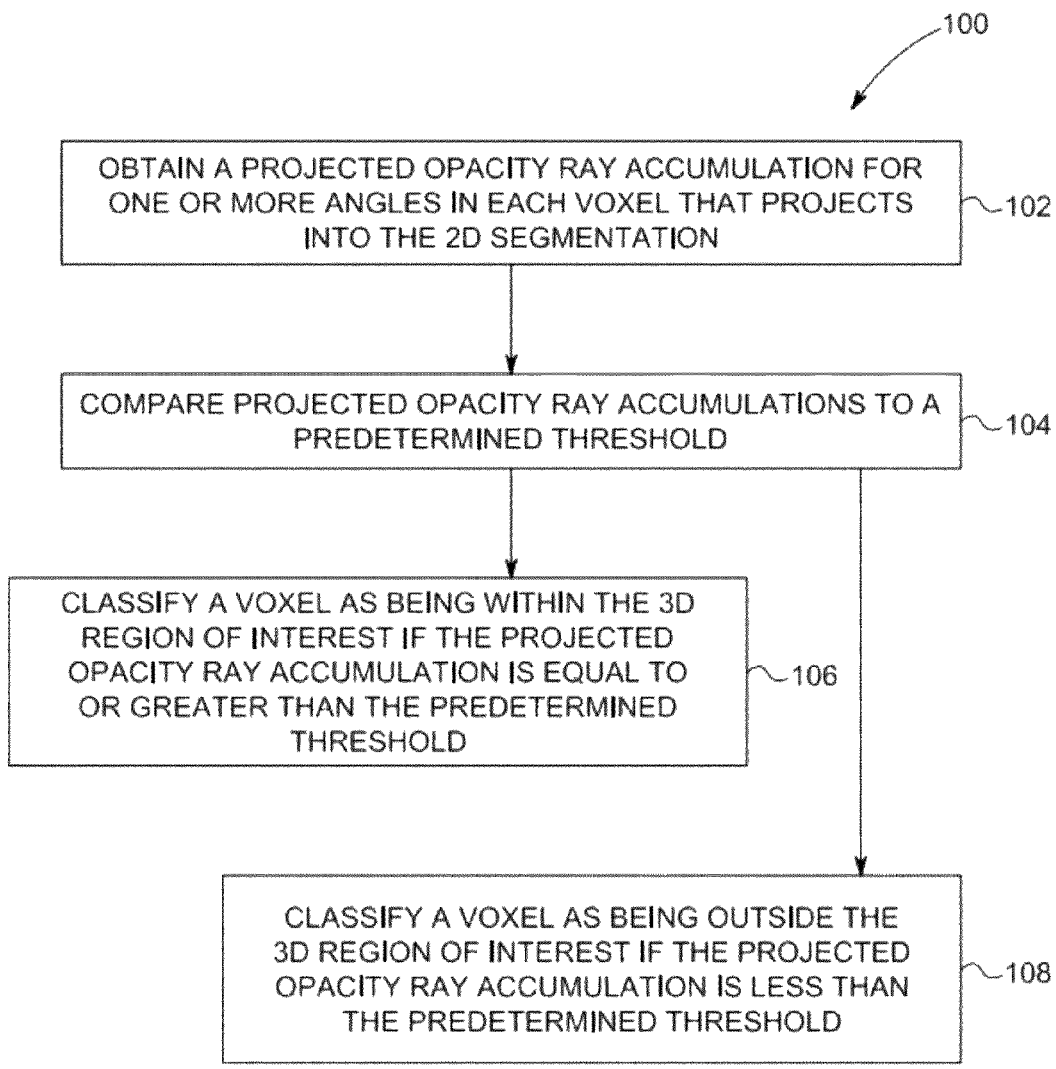
FIG. 9 is a flowchart of an exemplary embodiment of a method of using 3D rendering settings to determine whether voxels that project into the 2D segmentation should be classified as being within or outside the 3D region of interest.

FIG. 9 is a flowchart of one exemplary embodiment of a method 100 of using the 3D rendering settings (such as, but not limited to, at 32ba of method 20) to determine whether voxels that project into the 2D segmentation should be classified as being within or outside the 3D region of interest. The method 100 uses an opacity map of the rendered 3D volume data set. More specifically, the method 100 includes obtaining at 102, from the opacity map, a projected opacity ray accumulation for one or more angles in each voxel that projects into the 2D segmentation. The projected opacity ray accumulations are then compared at 104 to a predetermined threshold to determine whether the voxels should be classified within the 3D region of interest. If the projected ray opacity accumulation of a voxel is greater than or equal to the predetermined threshold, the voxel is classified at 106 as being within the 3D region of interest. If the projected ray opacity accumulation of a voxel is less than the predetermined threshold, the voxel is classified at 108 as being outside the 3D region of interest. The predetermined threshold may have any value. In some embodiments, the predetermined threshold is selected as a value that delineates whether a voxel is visible to a user within the rendered 3D volume data set, such as, but not limited to, approximately 500 HU.

Figure 10:
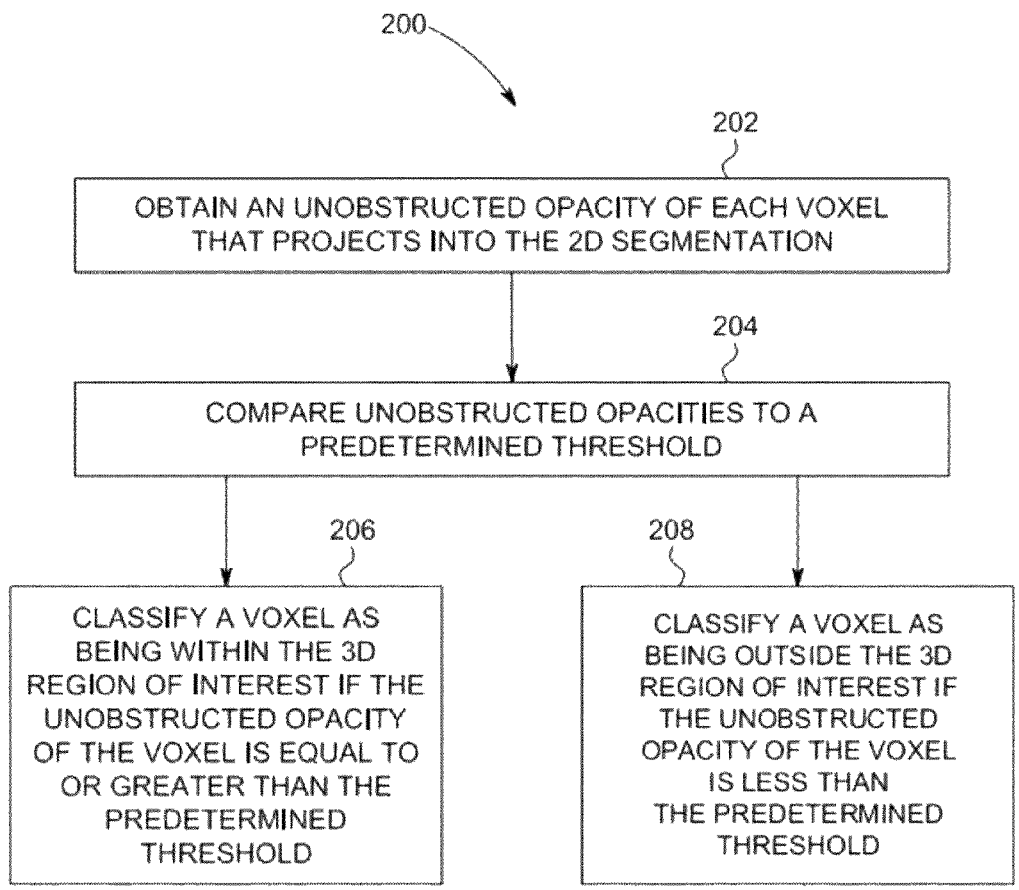
FIG. 10 is another flowchart of an exemplary embodiment of a method of using 3D rendering settings to determine whether voxels that project into the 2D segmentation should be classified as being within or outside the 3D region of interest.

FIG. 10 is a flowchart of another exemplary embodiment of a method 200 of using the 3D rendering settings (such as, but not limited to, at 32ba of method 20) to determine whether voxels that project into the 2D segmentation should be classified as being within or outside the 3D region of interest. Similar to the method 100, the method 200 also uses an opacity map of the rendered 3D volume data set. The method 200 includes obtaining at 202, from the opacity map, an unobstructed opacity of each voxel that projects into the 2D segmentation, wherein a voxel is opaque if an unobstructed light ray would not pass through it based on the 3D rendering settings. The unobstructed opacities are then compared at 204 to a predetermined threshold to determine whether the voxels should be classified within the 3D region of interest. If the unobstructed opacity of a voxel is greater than or equal to the predetermined threshold, the voxel is classified at 206 as being within the 3D region of interest. If the unobstructed opacity of a voxel is less than the predetermined threshold, the voxel is classified at 208 as being outside the 3D region of interest. The predetermined threshold may have any value. In some embodiments, the predetermined threshold is selected as a value that delineates whether a voxel is visible to a user within the rendered 3D volume data set, such as, but not limited to, approximately 500 HU.

Referring again to FIG. 1, after segmenting at 32, the method 20 optionally includes post-processing the segmented 3D volume data set. For example, one or more morphological operation (e.g., morphological filling) may be performed on the segmented 3D volume data set. Another example of post-processing includes, but is not limited to, connected components analysis and/or the like. If only a subset of the 3D volume data set was rendered at 24, the method 20 optionally includes repeating steps 24-32 across one, a plurality, or all subsets of the 3D volume data set. Moreover, the method 20 optionally includes repeating steps 24-32 across the same subset (or all if the original method 20 was performed on the entire 3D volume data set) to improve the segmentation of the 3D volume data set, for example to successively add or remove portions of the 3D region of interest. Repeating steps 24-32 across the same subset (or all if the original method 20 was performed on the entire 3D volume data set) may enable the removal of extraneous objects from the 3D region of interest and/or may enable the addition of missed objects to the 3D region of interest. Repeating steps 24-32 across the same subset (or all if the original method 20 was performed on the entire 3D volume data set) may enable the ability to perform AND or OR binary operations with the segmentation results of the successive iterations to create a more robust final segmentation.

At 34, the method 20 includes displaying the segmented 3D volume data set. The entire segmented 3D volume data set may be displayed at 34, or only the 3D region of interest may be displayed at 34. The display at 34 of the segmented 3D volume data set may include displaying one or more viewing planes of the 3D region of interest or one or more viewing planes of the entire 3D volume data set that was rendered at 24. The 3D region of interest is marked within the displayed segmented 3D volume data set by any type of indicator, such as, but not limited to, boundary lines, shading, highlighting, coloring, and/or the like. The indicator may be overlaid on the 3D volume data set that was rendered at 24.

One example of displaying at 34 a 3D volume data set that has been segmented according to the method 20 is shown in FIG. 8 as described above. FIG. 8 includes the 3D image 60a of a rendered 3D volume data set of a patient's neck and jaw. FIG. 8 also includes three viewing planes of the image 60a, namely the 2D coronal, axial, and sagittal images 60b, 60c, and 60d, respectively, of the patient's neck and jaw. The 3D region is marked within the images 60a-60d by the boundary lines 66 and shading 68. In the exemplary embodiment of FIG. 8, the 3D region of interest includes only the bone of the patient's mandible.

Figure 11:
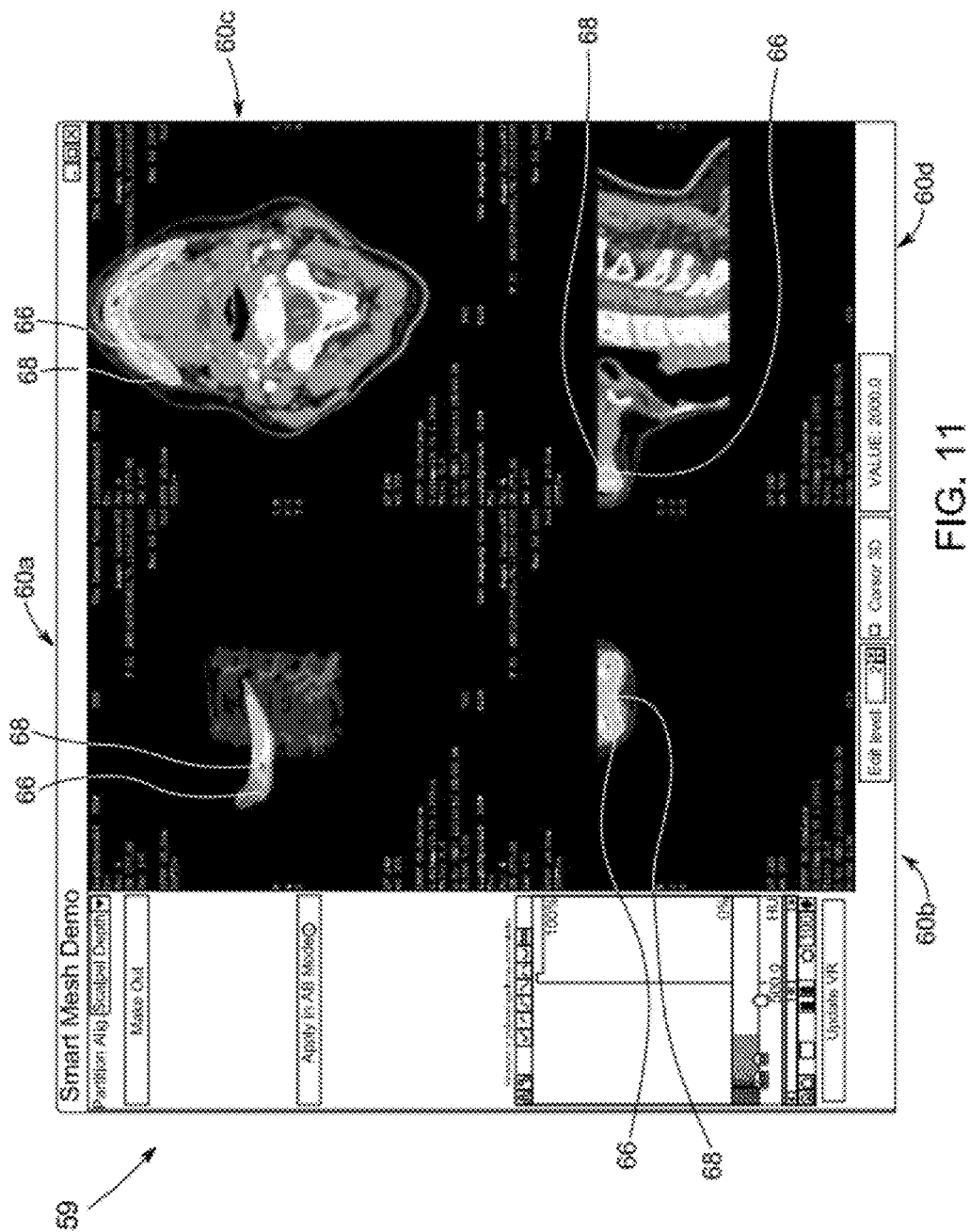
FIG. 11 illustrates the CT image shown in FIG. 8 displayed from a different orientation.

The displaying at 34 of the segmented 3D volume data set optionally includes displaying the segmented 3D volume data set from a different orientation, or angle, than the orientation at which the 3D volume data set that was rendered at 24. For example, FIG. 11 illustrates a 3D volume data set that has been segmented according to the method 20, but that is displayed from a different orientation than originally rendered at 24. More specifically, the image 60a within FIG. 11 has been rotated such that the image 60a is shown in a different orientation in FIG. 11 than in FIG. 4, which illustrates the orientation of the image 60a as originally rendered at 24. FIG. 8 also includes the 2D coronal, axial, and sagittal images 60b, 60c, and 60d, respectively. The 3D region is marked within the images 60a-60d by the boundary lines 66 and shading 68.

Optionally, the method 20 includes enabling a user to adjust the segmentation of the 3D volume data set based on the user's review of the segmented 3D volume data set displayed at 34. For example, a user may be able to change the boundary lines 66 of the 3D region of interest, adjust the 3D rendering settings, adjust the value of any thresholds used to determine whether voxels are within or outside the 3D region of interest, and/or the like.

It should be noted that if contrast agents are used during image acquisition, for example, Iodine in the blood or Barium for gastric track imaging, or if stents are present in the imaged region, these contrast agents and stents may cause artifacts and appear as another type of material (e.g., bone or tissue) due to large attenuation. Accordingly, in some embodiments, user intervention or user confirmation may be provided at one or more of the processing steps described herein.

Figure 12:
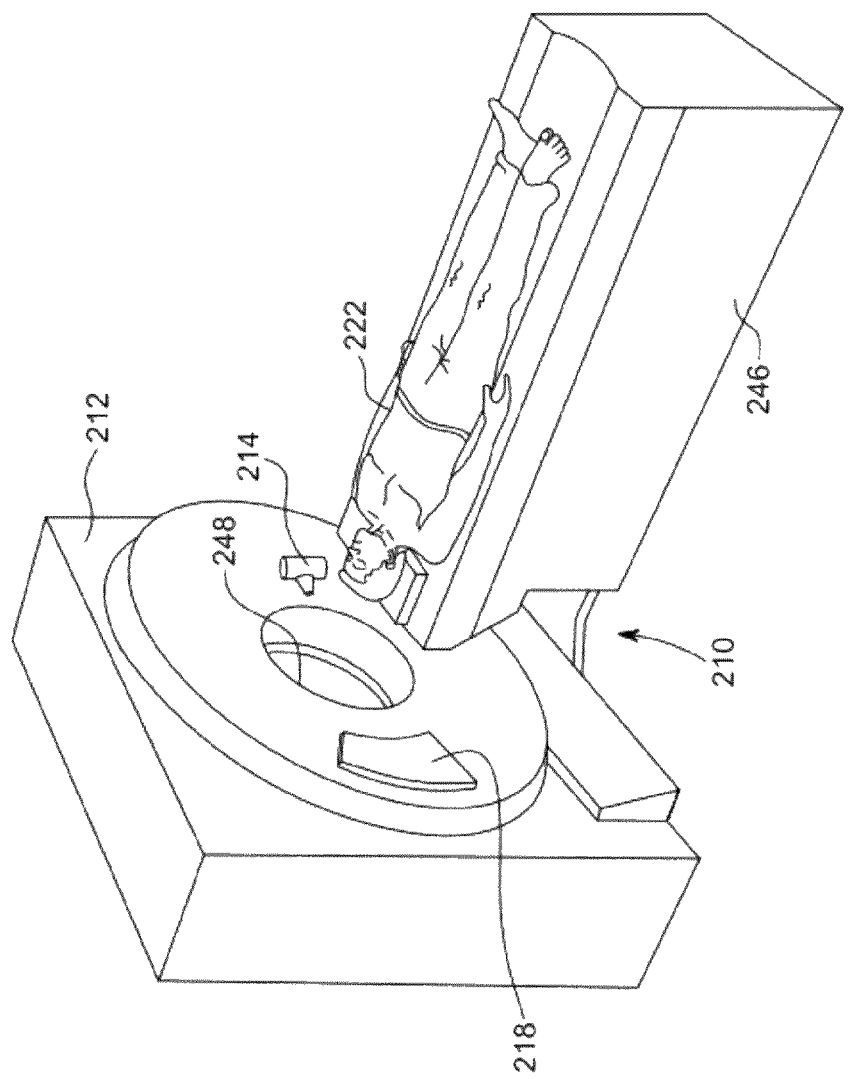
FIG. 12 is a pictorial drawing of a CT imaging system constructed in accordance with various embodiments.
Figure 13:
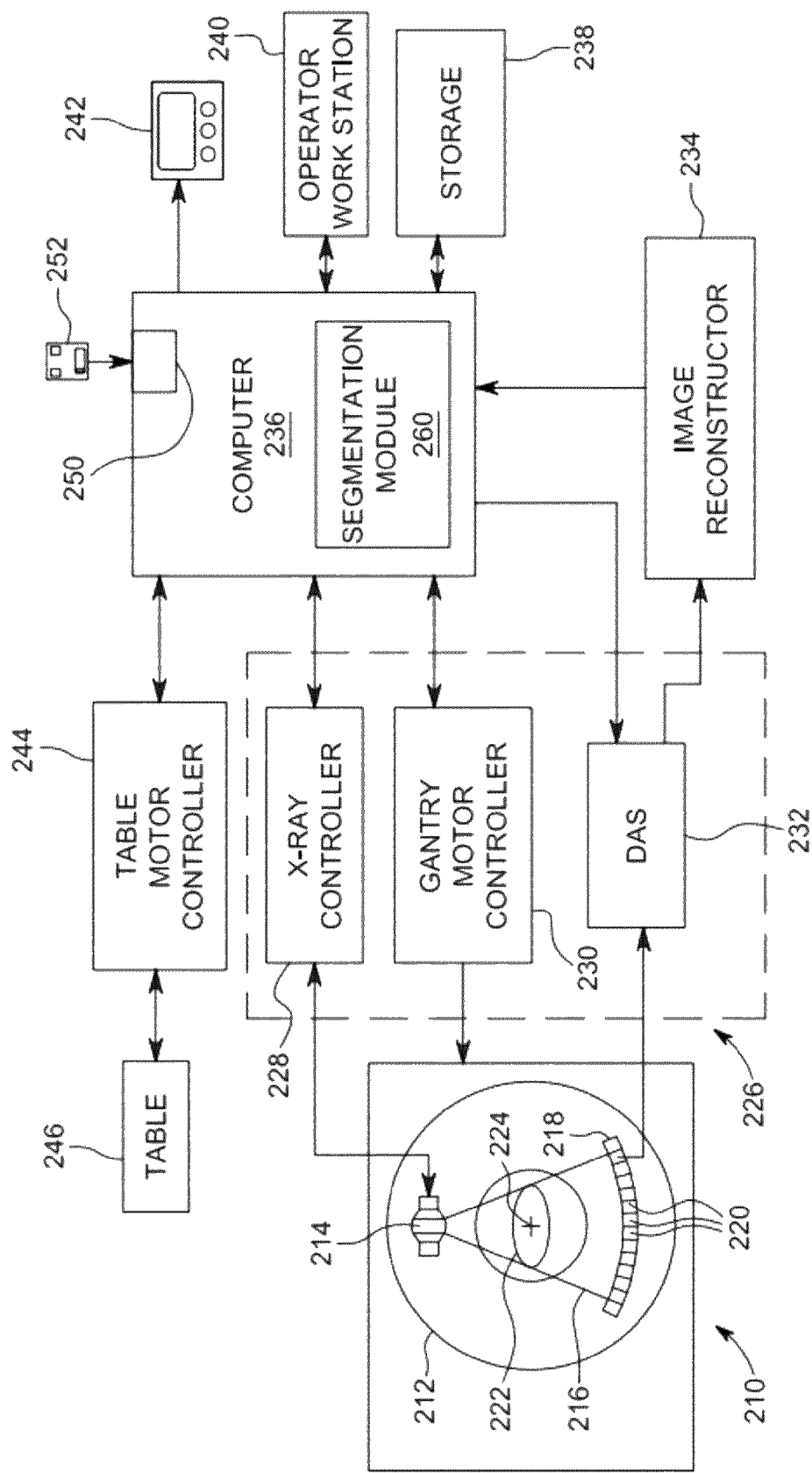
FIG. 13 is a schematic block diagram of the CT imaging system of FIG. 12.

Thus, various embodiments provide for segmenting 3D image volumes. The image data may be acquired by any suitable imaging system, such as, but not limited to, an MRI system, a CT system, an ultrasound system, a PET system, and/or the like. In the exemplary embodiment, the method 20 is described and illustrated herein with respect to a CT system. For example, referring to FIGS. 12 and 13, a multi-slice scanning imaging system, for example, a CT imaging system 210 is shown as including a gantry 212. The gantry 212 includes an x-ray tube 214 (also referred to as an x-ray source 214 herein) that projects a beam of x-rays 216 toward a detector array 218 on the opposite side of the gantry 212. The detector array 218 is formed by a plurality of detector rows (not shown) including a plurality of detector elements 220 that together sense the projected x-rays that pass through an object, such as a medical patient 222 between the array 218 and the source 214. Each detector element 220 produces an electrical signal that represents the intensity of an impinging x-ray beam and hence can be used to estimate the attenuation of the beam (and determine HU values for image voxels) as the beam passes through an object or the patient 222. During a scan to acquire x-ray projection data, the gantry 212 and the components mounted therein rotate about a center of rotation 224. FIG. 13 shows only a single row of detector elements 220 (i.e., a detector row). However, the multi-slice detector array 218 includes a plurality of parallel detector rows of detector elements 220 such that projection data corresponding to a plurality of quasi-parallel or parallel slices can be acquired simultaneously during a scan.

Rotation of components on the gantry 212 and the operation of the x-ray source 214 are controlled by a control mechanism 226 of CT system 210. The control mechanism 226 includes an x-ray controller 228 that provides power and timing signals to the x-ray source 214 and a gantry motor controller 230 that controls the rotational speed and position of components on the gantry 212. A data acquisition system (DAS) 232 in the control mechanism 226 samples analog data from the detector elements 220 and converts the data to digital signals for subsequent processing. An image reconstructor 234 receives sampled and digitized x-ray data from the DAS 232 and performs high-speed image reconstruction. The reconstructed image is applied as an input to a computer 236 that stores the image in a storage device 238. The image reconstructor 234 can be specialized hardware or computer programs executing on the computer 236.

The computer 236 also receives commands and scanning parameters from an operator via a console 240 that has a keyboard and/or other user input and/or marking devices, such as a mouse, trackball, or light pen. An associated display 242, examples of which include a cathode ray tube (CRT) display, liquid crystal display (LCD), or plasma display, allows the operator to observe the reconstructed image and other data from the computer 236. The display 242 may include a user pointing device, such as a pressure-sensitive input screen. The operator supplied commands and parameters are used by the computer 236 to provide control signals and information to the DAS 232, x-ray controller 228, and gantry motor controller 230. In addition, the computer 236 operates a table motor controller 244 that controls a motorized table 246 to position the patient 222 in the gantry 212. For example, the table 246 moves portions of the patient 222 through a gantry opening 248.

In one embodiment, the computer 236 includes a device 250, for example, a floppy disk drive, CD-ROM drive, DVD drive, magnetic optical disk (MOD) device, or any other digital device including a network connecting device such as an Ethernet device for reading instructions and/or data from a computer-readable medium 252, such as a floppy disk, a CD-ROM, a DVD or another digital source such as a network or the Internet, as well as yet to be developed digital means. In another embodiment, the computer 236 executes instructions stored in firmware (not shown). The computer 236 is programmed to perform segmentation of 3D image volumes according to the methods described and/or illustrated herein using a segmentation module 260, which may be implemented in hardware, software or a combination thereof.

As used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. The CT system may be, for example, different types of CT imaging systems, such as a third generation CT system, a fourth generation CT system (stationary detector–rotating x-ray source) and a fifth generation CT system (stationary detector and x-ray source), as well as first and second generation CT systems. Additionally, it is contemplated that the benefits of the various embodiments accrue to imaging modalities other than CT. Further, although the herein described methods and apparatus are described in a medical setting, it is contemplated that the benefits of the various embodiments accrue to non-human imaging systems such as those systems typically employed in an animal imaging.

In operation, the CT system 210 acquires CT image data, for example, 3D volume images of the patient that is used to generate 3D segmented images for display on the display 242.

Thus, various embodiments provide a semi-automatic 3D segmentation processes for segmenting 3D image volumes to define a 3D region of interest therein. The segmentation processes provided by the various embodiments may decrease the user interaction needed to generate a 3D segmentation, saving both time and money for the user, while still providing an output that matches what the user sees. In other words, the segmentation processes provided by the various embodiments may be faster, less difficult, less tedious, and/or more efficient for the user. The segmentation processes provided by the various embodiments output an image segmentation that intuitively aligns with what the user sees or expects to see.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for segmenting three-dimensional (3D) image volumes, the method comprising:
    obtaining a 3D volume data set corresponding to an imaged volume;
    rendering at least a portion of the 3D volume data set based on 3D rendering settings;
    creating a two-dimensional (2D) segmentation of the rendered 3D volume data set, wherein the 2D segmentation is a 2D region of interest selected within the rendered 3D volume data set; and
    segmenting the 3D volume data set using the 2D segmentation and the 3D rendering settings to define a 3D region of interest within the 3D volume data set.

2. The method of claim 1, wherein segmenting the 3D volume data set using the 3D rendering settings comprises classifying only voxels that are visible to a user in the rendered 3D volume data set as being within the 3D region of interest.

3. The method of claim 1, wherein segmenting the 3D volume data set using the 3D rendering settings comprises segmenting the 3D volume data set using at least one of the type of renderer, a depth setting, a clipping setting, a thickness setting, or an opacity map.

4. The method of claim 1, wherein segmenting the 3D volume data set using the 2D segmentation and the 3D rendering settings comprises:
    segmenting the 3D volume data set first using the 2D segmentation; and
    thereafter further segmenting the 3D volume data set using the 3D rendering settings.

5. The method of claim 1, wherein segmenting the 3D volume data set using the 2D segmentation and the 3D rendering settings comprises:
    classifying voxels that project outside the 2D segmentation as being outside the 3D region of interest; and
    using the 3D rendering settings to determine whether a voxel that projects into the 2D segmentation should be classified as being within or outside the 3D region of interest.

6. The method of claim 1, wherein segmenting the 3D volume data set using the 2D segmentation and the 3D rendering settings comprises:
    classifying voxels that project outside the 2D segmentation as being outside the 3D region of interest;
    classifying a voxel that projects into the 2D segmentation as being within the 3D region of interest if the voxel is visible to a user in the rendered 3D volume data set.

7. The method of claim 1, wherein segmenting the 3D volume data set using the 3D rendering settings comprises:
    classifying a voxel as being within the 3D region of interest if a projected ray opacity accumulation in the voxel is equal to or greater than a predetermined threshold; and
    classifying a voxel as being outside the 3D region of interest if the projected ray opacity accumulation in the voxel is less than a predetermined threshold.

8. The method of claim 1, wherein segmenting the 3D volume data set using the 3D rendering settings comprises:
    classifying a voxel as being within the 3D region of interest if an unobstructed opacity of the voxel is equal to or greater than a predetermined threshold; and
    classifying a voxel as being outside the 3D region of interest if the unobstructed opacity of the voxel is less than a predetermined threshold.

9. The method of claim 1, further comprising displaying the segmented 3D volume data set on a display.

10. The method of claim 1, further comprising displaying the rendered 3D volume data set and enabling a user to adjust the 3D rendering settings.

11. The method of claim 1, wherein creating the 2D segmentation of the rendered 3D volume data set comprises one of:
    manually creating the 2D segmentation wherein a user drawing the 2D segmentation on the rendered 3D volume data set;
    semi-automatically creating the 2D segmentation wherein a user guides a computer to create the 2D segmentation; or
    fully-automatically creating the 2D segmentation using a computer.

12. The method of claim 1, wherein segmenting the 3D volume data set using the 2D segmentation comprises projecting the 2D segmentation through the rendered 3D volume data set.

13. The method of claim 1, wherein the 3D image volume data set comprises one of computed tomography (CT) data, magnetic resonance imaging (MRI) data, ultrasound data, or positron emission tomography (PET) data.

14. A system for segmenting three-dimensional (3D) image volumes, the system comprising:
    a computer configured to:
        obtain a 3D volume data set corresponding to an imaged volume;
        render at least a portion of the 3D volume data set based on 3D rendering settings;
        create a two-dimensional (2D) segmentation of the rendered 3D volume data set, wherein the 2D segmentation is a 2D region of interest selected within the rendered 3D volume data set; and
        segment the 3D volume data set using the 2D segmentation and the 3D rendering settings to define a 3D region of interest within the 3D volume data set; and
    a display configured to display the segmented 3D volume data set.

15. The system of claim 14, wherein the computer is configured to segment the 3D volume data set using the 3D rendering settings by classifying only voxels that are visible to a user in the rendered 3D volume data set as being within the 3D region of interest.

16. The system of claim 14, wherein the computer is configured to segment the 3D volume data set using the 3D rendering settings by using at least one of the type of renderer, a depth setting, a clipping setting, a thickness setting, or an opacity map.

17. The system of claim 14, wherein the computer is configured to segment the 3D volume data set using the 2D segmentation and the 3D rendering settings by:
    classifying voxels that project outside the 2D segmentation as being outside the 3D region of interest; and
    using the 3D rendering settings to determine whether a voxel that projects into the 2D segmentation should be classified as being within or outside the 3D region of interest.

18. The system of claim 14, wherein the computer is configured to segment the 3D volume data set using the 3D rendering settings by:
- classifying a voxel as being within the 3D region of interest if the projected ray opacity accumulation of the voxel is greater than a predetermined threshold; and
- classifying a voxel as being outside the 3D region of interest if a projected ray opacity accumulation of the voxel is less than a predetermined threshold.

19. The system of claim 14, wherein the computer is configured to segment the 3D volume data set using the 3D rendering settings by:
- classifying a voxel as being within the 3D region of interest if an unobstructed opacity of the voxel is greater than a predetermined threshold; and
- classifying a voxel as being outside the 3D region of interest if the unobstructed opacity of the voxel is less than a predetermined threshold.

20. A non-transitory computer readable medium including instructions to instruct a computer to:
- render at least a portion of a 3D volume data set using 3D rendering settings;
- create a two-dimensional (2D) segmentation of the rendered 3D volume data set, wherein the 2D segmentation is a 2D region of interest selected within the rendered 3D volume data set; and
- segment the 3D volume data set using the 2D segmentation and the 3D rendering settings to define a 3D region of interest within the 3D volume data set.

\* \* \* \* \*